Jan. 4, 1966   A. B. CROSBY   3,227,601
CELLULAR STRUCTURAL MATERIAL
Filed Feb. 11, 1963   2 Sheets-Sheet 1

Inventor
Andrew Basil Crosby
By Cushman, Darby & Cushman
Attorneys

Jan. 4, 1966 A. B. CROSBY 3,227,601
CELLULAR STRUCTURAL MATERIAL

Filed Feb. 11, 1963 2 Sheets-Sheet 2

3,227,601
CELLULAR STRUCTURAL MATERIAL
Andrew Basil Crosby, Farnham, England, assignor of one-half to Crosby and Company Limited, Farnham, England, a company of Great Britain
Filed Feb. 11, 1963, Ser. No. 257,639
Claims priority, application Great Britain, Feb. 16, 1962, 6,145/62
4 Claims. (Cl. 161—69)

This invention relates to cellular structural elements and is more particularly, but not exclusively, concerned with a cellular structural element which may, for example, be made from a material such as paper, chipboard or similar cellulosic fibrous material, and which can be faced on opposite sides by boards or skins to form a sandwich of high strength/weight ratio. Such elements may, for example, be used in the manufacture of doors and wall-sections.

According to the invention there is provided a cellular structural element comprising a plurality of strips of material arranged face to face in parallel relationship and a plurality of spacing members disposed between and interconnecting the opposing faces of each pair of neighbouring strips, the spacing members being constructed in a manner and/or from a material such that the spacing between any two strips may be varied within limits determined by the length of the spacing members, the spacing members interconnecting any one pair of strips being generally parallel to each other whatever the spacing of the strips interconnected by them, each of the interconnecting spacing members being joined to the two strips which it interconnects by having at least a part of one face of one end portion thereof bonded to the surface of one of the strips substantially at right angles to the length of said strip and at least a part of the opposite face of the other end portion thereof bonded to the surface of the other of the two strips substantially at right angles to the length of said other strip.

Generally, the strips are of equal width and the spacing members are of the same width as the strips and are bonded to the strips across the whole width of the face of the end portions thereof. In addition, in a preferred embodiment the areas of attachment to the two faces of each strip of the two series of interconnecting spacing members bonded thereto are, within normal tolerances, directly opposite each other. Advantageously, the spacing members are of equal lengths and are spaced apart by a distance equal to their length so that on closing the cellular structural material, i.e. on reducing the spacing between the strips to a minimum, the spacing members lie end to end between the strips. In order to permit the spacing between any two strips to be varied, the spacing members may, for example, be made from a flexible material such as paper, or alternatively may be made from cardboard or chipboard or other such material, which is relatively rigid compared with paper, each of the spacing members then being provided with two lines of perforations or being folded across the width thereof close to the areas of attachment of the spacing member to the strips, thereby forming a hinged connection between the strips and spacing member.

In a preferred embodiment the two series of spacing members interconnecting any group of three adjacent strips are joined to the strips in a manner such that, when the strips are spaced apart by a distance less than the maximum permitted by the spacing members, the two series of spacing members are inclined in transverse directions.

The cellular structural elements may be formed, for example, from a stack comprising layers of sheet material alternating with layers each consisting of a plurality of strips arranged side by side, each strip being bonded to the two layers of sheet material between which it is disposed by having one edge portion of one face thereof bonded to one layer of sheet material and the other edge portion of the other face thereof bonded to the other layer of sheet material, the adjacent edges of neighbouring strips being joined to opposite layers of the sheet material. To form the desired structural element the stack is cut substantially at right angles to the length of said strips into elements of the desired width thereby dividing the layers of sheet material into strips and the layers of strips into spacing members.

The spacing members can be most readily bonded to the strips by adhesive.

As already indicated, the structural element can be made from chipboard, cardboard or paper, or similar cellulosic fibrous material, which may be impregnated with various synthetic impregnants to improve the strength or other physical properties thereof, e.g. water repellency. The strips and spacing members may be made from the same or different materials and the strips are generally made of a substantially stronger or more rigid material than the spacing members.

For a better understanding of the invention, reference will now be made by way of example to the accompanying drawings in which.

Figure 1:
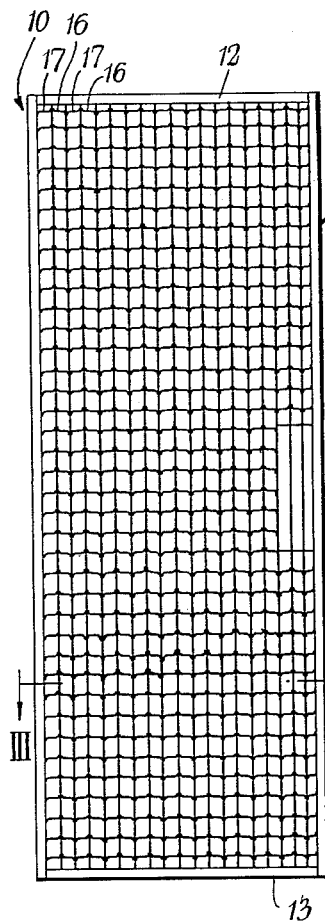
FIGURE 1 shows an elevation of a door, with one facing member removed, employing a structural element according to the invention.
Figure 2:
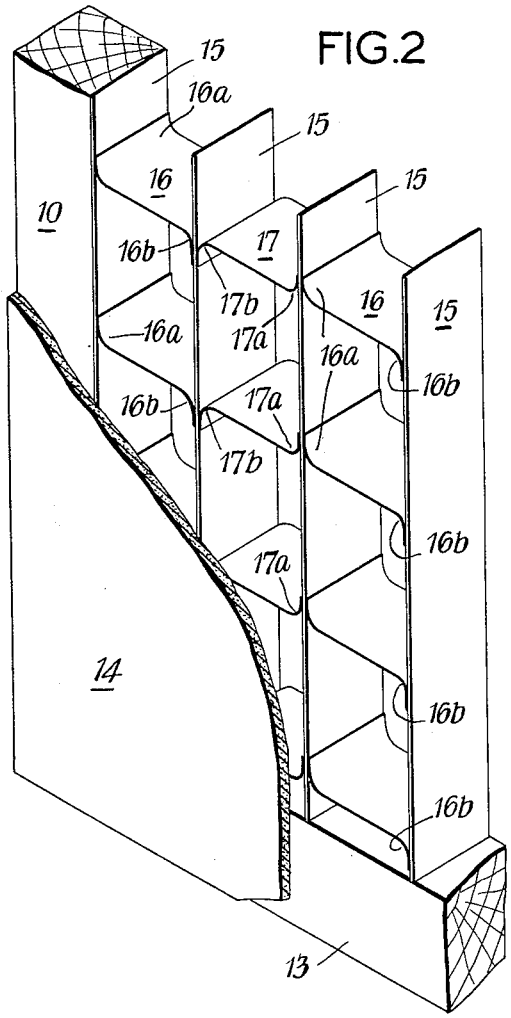
FIGURE 2 shows an isometric detail of one corner of the door of FIGURE 1 with parts cut away to show the construction thereof.
Figure 3:
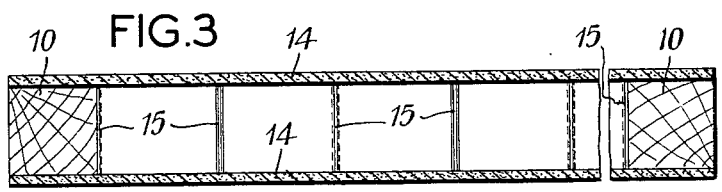
FIGURE 3 is a sectional plan on the line III—III of FIGURE 1.

Referring to FIGURES 1, 2 and 3 of the drawings, the door has a frame comprising two stiles 10, 11 spaced apart by, and secured to, a top rail 12, and a bottom rail 13. On each side the door has a facing member 14 secured by its edges to the members 10, 11, 12 and 13.

The facing members 14 are made from the compressed wood fibre material known as hardboard.

The space between the facing members is filled with a cellular structural element made from paper and a type of cardboard known as chipboard. In more detail, the cellular structural element comprises a number of strips 15 of chipboard the strips being arranged face to face with each other in parallel. Each strip 15 extends from the top to the bottom rail, and the strips at the two ends of the line are glued to the stiles 10, 11 respectively. Each neighbouring pair of strips 15 are interconnected by a series of interconnecting spacing members 16 and 17 which in the present instance are made of good quality brown paper. Each interconnecting spacing member 16, 17 is of the same width as the strips 15 and is secured between two such strips 15 by having one face of one end portion 16a, 17a glued to one strip 15 and the opposite face of the other end portion 16b, 17b glued to the next adjacent strip 15. The ends 16a and 17a, and 16b and 17b of the spacing members 16, 17 glued to opposite surfaces of the strips 15 are arranged directly opposite one another. The series of interconnecting spacing members 16 alternate with the series of spacing members 17.

The facing members 14 are also glued to the lateral edges of the strips 15 and the interconnecting spacing members 16, 17.

Prior to its fixing in the door the cellular structure is collapsible in concertina fashion so that the members 15 are spaced apart only by the intermediate thickness of the interconnecting spacing members 16, 17. When collapsed the edges 16b, 17b lie close to, but do not overlap, the edges 16a, 17a of the next spacing member in their respective series.

Figure 4:
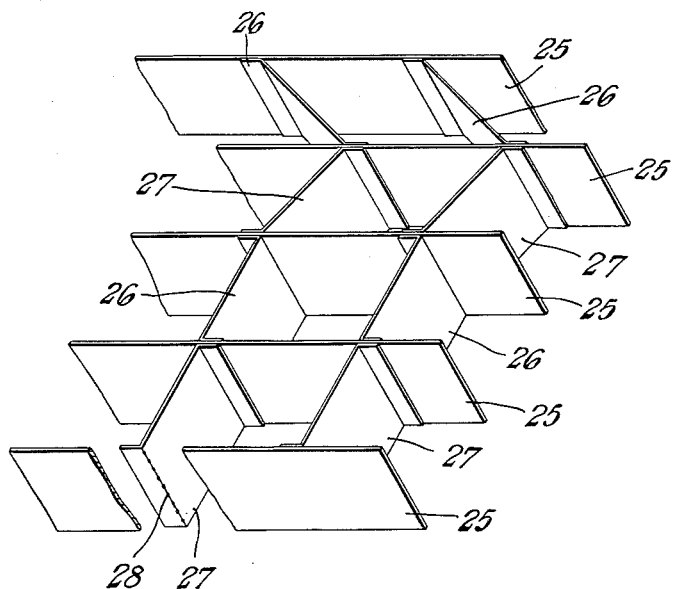
FIGURE 4 shows a perspective view of an alternative embodiment of a cellular structural element according to the invention in which some of the cells are partly collapsed.

Referring now to FIGURE 4, there is shown therein a cellular structural element in which strips 25 are spaced apart by spacing members 26 and 27 which are made from chipboard and which are provided with perforations 28 adjacent the areas of attachment of the spacing members to the strips thereby forming a hinge. Two rows of cells are shown partly collapsed, the two series of spacing members, which together with the appropriate strips, from the partly collapsed cells being inclined in transverse direction.

I claim:

1. A collapsible cellular structural element comprising at least three strips of material arranged face-to-face in parallel relationship, and a series of spacing members disposed between and interconnecting the opposing faces of each pair of neighboring strips, each strip and spacing member being capable of withstanding compressive forces in its own plane without deforming, each of said spacing members having a first flange portion at one end thereof and a second flange portion at the opposite end thereof said first flange portion extending in a first direction, said second flange portion extending in a second direction opposite therefrom whereby said spacing member is joined to the two strips which it interconnects by having at least a part of one flange portion bonded to one of said opposing faces and at least a part of the other flange portion bonded to the other said opposing faces, the portion of the spacing members between said first and second flange portion adapted to be perpendicularly transverse to said strips when the collapsible cellar structural element is fully extended, said spacing members between each pair of neighboring strips being of equal length and spaced from one another a distance such that when the element is collapsed the first flange portion of each spacing member between each pair of neighboring strips is closely adjacent the second flange portion of one of the spacing members adjacent thereto and the second flange portion of each spacing member between each pair of neighboring strips is closely adjacent the first flange portion of the other spacing member adjacent thereto whereby when the element is collapsed the spacing members between each pair of neighboring strips lie in a plane substantially parallel to said strips, and wherein the spacing members interconnecting said three strips are joined to said strips in a manner such that when the strips are spaced apart by a distance less than the maximum permitted by the length of the spacing members, the series of spacing members defined on either side of the central strip are inclined in opposite directions.

2. A collapsible cellular structural element as claimed in claim 1, wherein said strips of material and spacing members are formed from a cellulosic fibrous material selected from the group consisting of paper, chipboard and hardboard.

3. A collapsible cellular structural element as claimed in claim 2, wherein said strips of material and spacing members are impregnated with a synthetic impregnant to improve the physical properties thereof.

4. A double-skin sandwich structure comprising two facing members having disposed therebetween and bonded thereto a cellular structural element comprising at least three strips of material arranged face-to-face in parallel relationship, and a series of spacing members disposed between and interconnecting the opposing faces of each pair of neighboring strips, each strip and spacing member being capable of withstanding compressive forces in its own plane without deforming, each of said spacing members having a first flange portion at one end thereof and a second flange portion at the opposite end thereof said first flange portion extending in a first direction, said second flange portion extending in a second direction opposite therefrom whereby said spacing member is joined to the two strips which it interconnects by having at least a part of one flange portion bonded to one of said opposing faces and at least a part of the other flange portion bonded to the other of said opposing faces, the portion of the spacing member between said first and second flange portions adapted to be perpendicularly transverse to said strips when the collapsible cellular structural element is fully extended, said spacing members between each pair of neighboring strips being of equal length and spaced from one another a distance such that when the element is collapsed the first flange portion of each spacing member between each pair of neighboring strips is closely adjacent the second flange portion of one of the spacing members adjacent thereto and the second flange portion of each spacing member between each pair of neighboring strips is closely adjacent the first flange portion of the other spacing member adjacent thereto whereby when the element is collapsed the spacing members between each pair of neighboring strips lie in a plane substantially parallel to said strips, and wherein the spacing members interconnecting said three strips are joined to said strips in a manner such that when the strips are spaced apart by a distance less than the maximum permitted by the length of the spacing members, the series of spacing members defined on either side of the central strip are inclined in opposite directions.

References Cited by the Examiner

UNITED STATES PATENTS

| 2,173,808 | 9/1939 | Kellogg | 154 |
| 2,464,380 | 5/1949 | Daiber | 161—68 |
| 2,750,313 | 6/1956 | Schwartz et al. | 161—69 |
| 2,977,265 | 3/1961 | Frosberg et al. | 154 |
| 3,109,766 | 11/1963 | Norris | 161—68 |

FOREIGN PATENTS

| 665,850 | 1/1952 | Great Britain. |
| 148,862 | 2/1955 | Sweden. |

ALEXANDER WYMAN, *Primary Examiner.*

MORRIS SUSSMAN, EARL M. BERGERT,
*Examiners.*